United States Patent
Huh et al.

(10) Patent No.: US 6,618,369 B1
(45) Date of Patent: Sep. 9, 2003

(54) INTERNET PHONE PROTOCOL

(75) Inventors: Jung Sun Huh, Seoul (KR); Jung Hyun Kim, Yongin (KR); Man Su Jeong, Seoul (KR); Hyeon Cheol Cho, Kwachon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/405,007

(22) Filed: Sep. 27, 1999

(30) Foreign Application Priority Data

Sep. 29, 1998 (KR) .............................................. 98/40658
Oct. 13, 1998 (KR) .............................................. 98/42763

(51) Int. Cl.[7] .............................................. H04L 12/66
(52) U.S. Cl. ....................... 370/352; 370/353; 370/354; 370/389
(58) Field of Search ................................ 370/351, 352, 370/353, 354, 355, 356, 357, 358, 400, 401, 252, 389; 379/88.17, 88.18

(56) References Cited

U.S. PATENT DOCUMENTS

| | | | |
|---|---|---|---|
| 5,438,614 A | * 8/1995 | Rozman et al. | 379/93.08 |
| 5,870,744 A | * 2/1999 | Sprague | 707/9 |
| 5,991,799 A | * 11/1999 | Yen et al. | 709/218 |
| 6,101,180 A | * 8/2000 | Donahue et al. | 370/352 |
| 6,173,316 B1 | * 1/2001 | De Boor et al. | 709/218 |
| 6,208,864 B1 | * 3/2001 | Agrawal et al. | 455/445 |
| 6,266,339 B1 | * 7/2001 | Donahue et al. | 370/432 |
| 6,292,478 B1 | * 9/2001 | Farris | 370/352 |
| 6,314,464 B1 | * 11/2001 | Murata et al. | 709/226 |
| 6,381,250 B1 | * 4/2002 | Jacobson et al. | 370/468 |
| 6,546,003 B1 | * 4/2003 | Farris | 370/352 |

* cited by examiner

Primary Examiner—Wellington Chin
Assistant Examiner—Jamal A. Fox
(74) Attorney, Agent, or Firm—Fleshner & Kim, LLP

(57) ABSTRACT

An Internet phone protocol including a physical hierarchy for providing a mechanic and functional units for connecting, maintaining and releasing between linking media; a device driver hierarchy for defining driving characteristics of each electric and mechanic unit of the physical hierarchy; a real time operating system (RTOS) programming hierarchy for controlling an overall system; a user datagram protocol (UDP)/Internet protocol (IP) hierarchy for defining characteristics for processing a packet stream in packet change; an interface hierarchy for receiving a user's intention to a system; a voice/real-time transport protocol (VOICE/RTP) hierarchy for linking a voice channel between Internet phones; and an independent multimedia office communication system protocol (referred to as MOCS protocol hereinafter) hierarchy for rendering Internet phones to store in exchange status information to each other for independent and direct linking, by which one Internet phone indenpendently and directly transfers its own status information to all of the other Internet phones connected to the LAN, so that it can be directly linked to a desired Internet phone without a call server.

16 Claims, 4 Drawing Sheets

INTERNET PHONE PROTOCOL

BACKGROUND OF THE INVENTION

1. Field of the Invention

The present invention relates to an Internet phone protocol, and more particularly, to an Internet phone protocol by which one Internet phone can be independently linked to all of the other Internet phones connected to a LAN by transferring its own status information without a call server.

2. Description of the Background Art

Recently, in a business office environment, a LAN (local area network) is becoming an important communication resource more than an interphone network. In this respect, however, the LAN and the interphone are separately networked, which causes double expense incurred for maintenance.

In an attempt to solve the problem, the interphone network has been substituted with the LAN by a terminal (referred to as Internet phone, hereinafter) which is operable in the LAN.

FIG. 1 shows a LAN construction where a protocol based on the call server is applied to an Internet phone in a conventional art. As shown in this drawing, a plurality of Internet phones (IP Phone 1–IP Phone N) and a plurality of personal computers (PC1–PC N) are connected to the LAN. A call server having all the status information of the Internet phone and relay linking between Internet phones is also connected thereto.

Linking process of the conventional Internet phone as constructed above will now be described with reference to accompanying drawings.

FIG. 2 is a state view of the linking process of the Internet phone in accordance with the conventional art. As shown in this drawing, a call process for linking is started as a first Internet phone (IP Phone 1) starts to output a setup message to the call server.

The call server checks a status of the first Internet phone (IP Phone 1) and a second Internet phone (IP Phone 2) desired to be linked by the first Internet phone, to judge whether or not they can be linked. Upon such judgement, if the second Internet phone is in a feasible status for linking, the call server outputs a setup message to the second Internet phone.

Upon receipt of the setup message, the second Internet phone confirms whether or not itself is in a feasible status for linking, and outputs a connection message to the call server, and then, the call server outputs the connection message to the first Internet phone, thereby linking the first and second Internet phones.

However, operated according to the protocol based on the call server, the conventional Internet phone does not have any other information than its own status information. And, since the call server has the status information of all the Internet phones connected to the LAN and relays linking between the Internet phones, if the call server is malfunctioned, communication itself between the Internet phones is impossible. Moreover, since the call server is needed even for operating only one or two Internet phones, it is very inconvenient for users to easily access for use.

SUMMARY OF THE INVENTION

Therefore, an object of the present invention is to provide a status message structure for Internet phone in which one Internet phone independently transfers its status information to all of the other Internet phones connected to a LAN so that it can be directly linked to a desired Internet phone without a call server, thereby building up an interphone network by merely connecting the Internet phone to the LAN.

To achieve these and other advantages and in accordance with the purpose of the present invention, as embodied and broadly described herein, there is provided an Internet phone protocol including: a physical hierarchy for providing a mechanic and functional units for connecting, maintaining and releasing between linking media; a device driver hierarchy for defining driving characteristics of each electric and mechanic unit of the physical hierarchy; a real time operating system (RTOS) programming hierarchy for controlling an overall system; a user datagram protocol (UDP)/Internet protocol (IP) hierarchy for defining characteristics for processing a packet stream in packet change; an interface hierarchy for receiving a user's intention to a system; a voice/real-time transport protocol (VOICE/RTP) hierarchy for linking a voice channel between Internet phones; and an independent multimedia office communication system protocol (referred to as MOCS protocol hereinafter) hierarchy for rendering Internet phones to store in exchange status information to each other for independent and direct linking.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
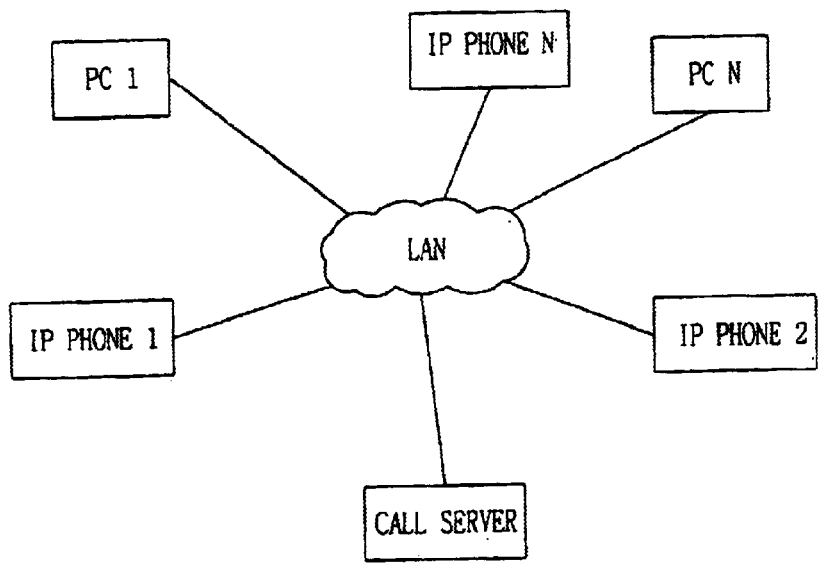
FIG. 1 shows a LAN construction where a protocol based on the call server is applied to an Internet phone in accordance with a conventional art.
Figure 2:
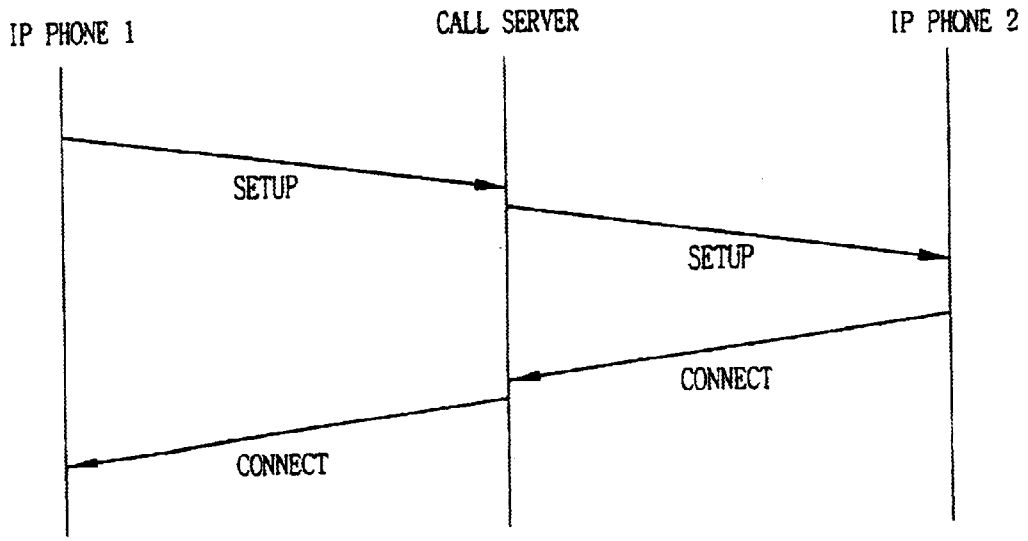
FIG. 2 is a state view of a linking process of Internet phones in accordance with the conventional art.
Figure 3:
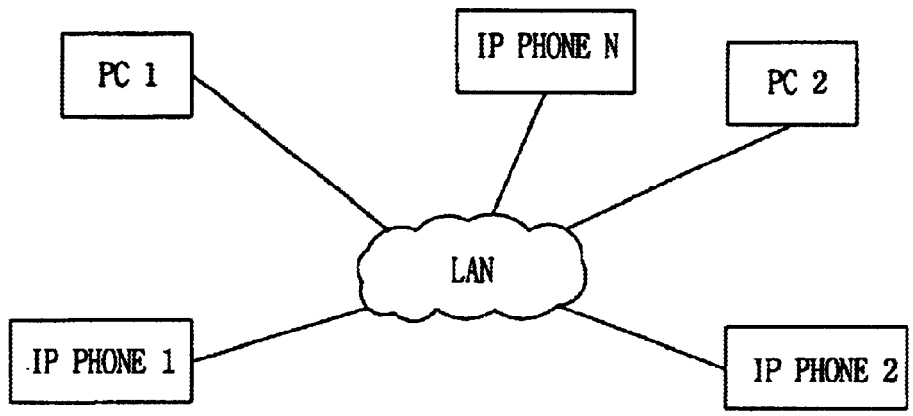
FIG. 3 shows a LAN construction adopting an Internet phone protocol in accordance with the present invention.

FIG. 3 shows a LAN construction adopting an Internet phone protocol in accordance with the present invention. As shown in this drawing, plural Internet phones (IP Phone 1 and IP Phone 2) and plural personal computers (PC 1 and PC2) are connected to the LAN. That is, the Internet phones communicates with each other without an additional server. Details of it will now be described with reference to FIGS. 4 through 9.

Figure 4:
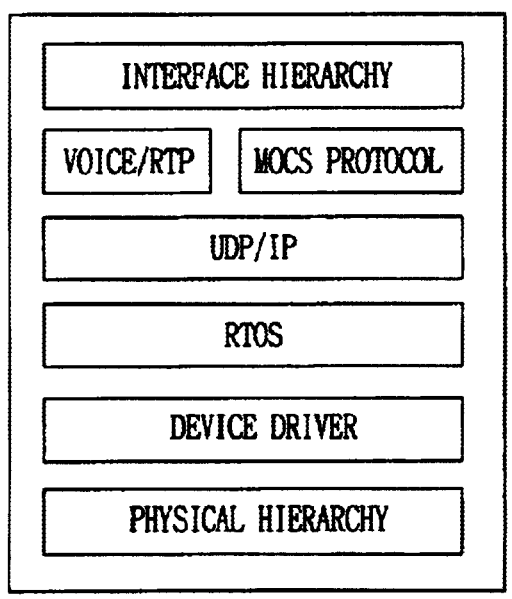
FIG. 4 shows a structure of Internet phone protocol as classified by hierarchies in accordance with the present invention.

FIG. 4 shows a structure of Internet phone protocol as classified by hierarchies in accordance with the present invention. As shown in this drawing, the Internet phone protocol including a physical hierarchy for providing a mechanic and functional units for connecting, maintaining and releasing between linking media; a device driver hierarchy for defining driving characteristics of each electric and mechanic unit of the physical hierarchy; a real time operating system (RTOS) programming hierarchy for controlling an overall system; a user datagram protocol (UDP)/Internet protocol (IP) hierarchy for defining characteristics for processing a packet stream in packet change; an interface hierarchy for receiving a user's intention to a system; a voice/real-time transport protocol (VOICE/RTP) hierarchy for linking a voice channel between Internet phones, further includes an independent multimedia office communication system protocol (referred to as MOCS protocol hereinafter) hierarchy for rendering Inter phones to store in exchange status information to each other for independent and direct linking.

Figure 5:
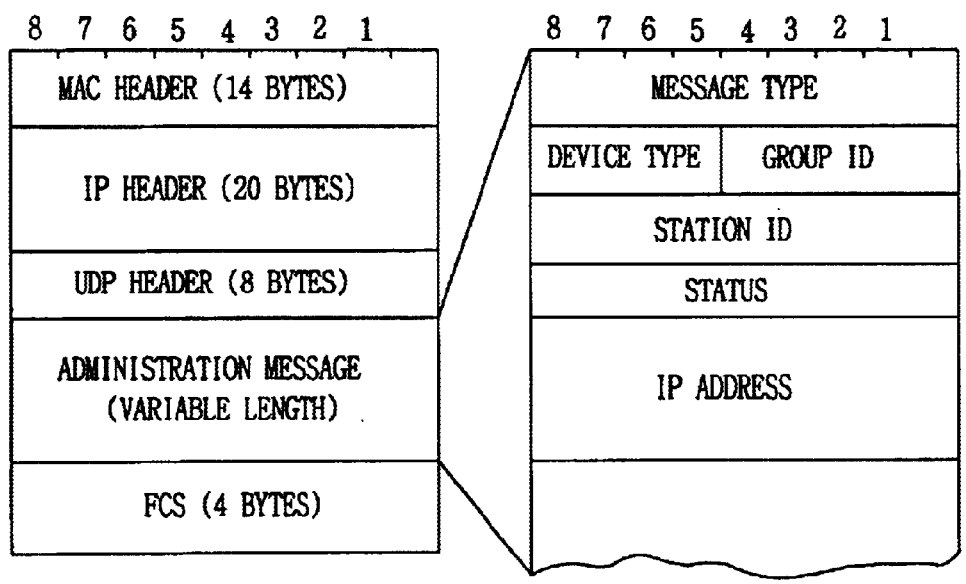
FIG. 5 illustrates a frame structure of an administration message in accordance with the present invention.

FIG. 5 illustrates a frame structure of an administration message in accordance with the present invention. As shown in this drawing, the message frame includes a 14-byte media access control (MAC) header positioned at the uppermost place for setting an eithernet address of its own of one Internet phone and that of the other Internet phone receiving a message; a 20-byte IP header (Internet protocol header) and a 8-byte UDP header for setting an IP address and a UDP of the other Internet phone receiving a message; a 4-byte frame check sequence (FCS) for confirming whether a content of the one Internet phone is accurately transferred to the other Internet phone without an error, and further includes a variable length status message header (also referring to as an administration message) having an interphone number, status information and error information for establishing an independent linking between Internet phones.

The status message includes a message type region positioned at the uppermost place for setting up a message type required for call control; a device type setting region for discriminating kind of each terminal connected to the LAN; a group ID region for setting a group for answering a phone from an external source like in a key phone; a station ID region for setting a number on each terminal for interphoning; a status region for storing a current status information of each terminal; an IP address region for storing an IP address of each terminal connected to a LAN.

Examples of status message constructed as the above-described message frame is shown in the below table 1.

TABLE 1

| Group | Station | Device | IP address | Status |
|-------|---------|--------|------------|--------|
| 1 | 101 | 5(IP) | 192.168.1.2 | 1(idle) |
| 1 | 102 | 5(IP) | 192.168.1.3 | 1(idle) |
| . | . | . | . | . |
| . | . | . | . | . |
| . | . | . | . | . |
| 2 | 109 | 5(IP) | 192.168.1.10 | 1(idle) |
| 6 | 181 | 5(IP) | 192.168.1.182 | 2(busy) |
| Null | 1004 | 1(FS) | 192.168.1.254 | 1(idle) |
| 1 | 4881 | 2(GPB) | 192.168.1.253 | 1(idle) |
| 1 | 4882 | 2(GPB) | 192.168.1.253 | 2(busy) |

In this respect, the message type is to discriminate a message required control. The status message includes a 1 byte region for message type and 8 byte region for storing other terminal information.

Accordingly, the Internet phones transfer and receive the status message having the above structure to each other, and by thusly sharing the status message, independent linking therebetween can be possible without a call server.

Figure 6:
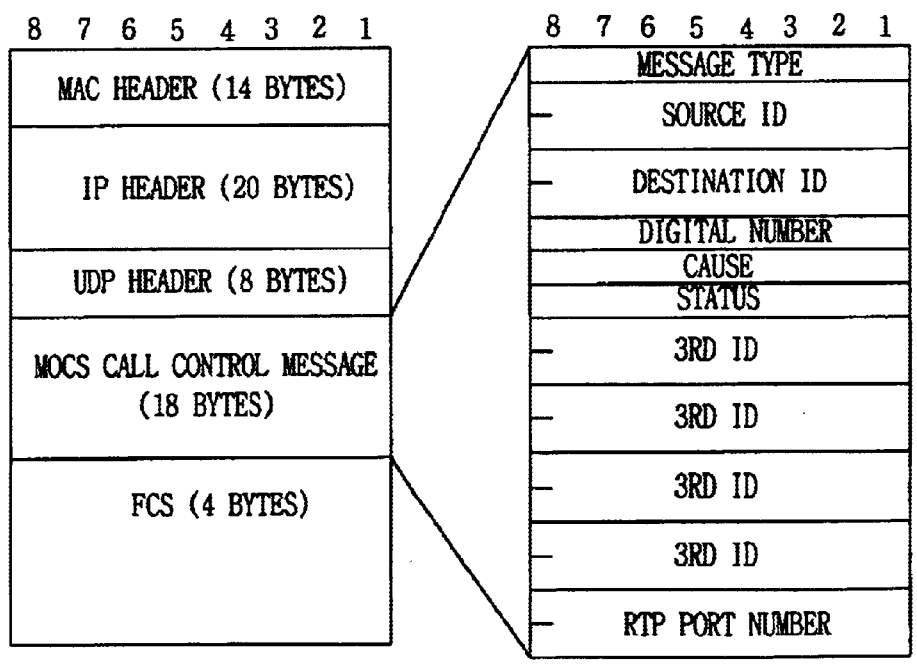
FIG. 6 illustrates a frame structure of a setup message in accordance with the present invention.

FIG. 6 illustrates a frame structure of a setup message in accordance with the present invention. As shown in this drawing, the message frame includes a 14-byte media access control (MAC) header positioned at the uppermost place for setting an Ethernet address of its own of one Internet phone and that of the other Internet phone receiving a message; a 20-byte IP header (Internet protocol header) and a 8-byte UDP header for setting an IP address and a UDP of the other Internet phone receiving a message; a 4-byte frame check sequence (FCS) for confirming whether a content of the one Internet phone is accurately transferred to the other Internet phone without an error, and further includes an 18-byte MOCS call control message having an interphone number, status information and error information for establishing an independent linking between Internet phones.

The 18-byte MOCS call control message includes a 1-byte region positioned at its uppermost place for setting a message type required for a call control; a 2-byte region for setting an interphone number ('Source ID') of an Internet phone transferring the next message; a 2-byte region for setting an interphone number ('Destination ID') of an Internet phone receiving the next message; a 1-byte region for setting a dialing number ('Digital number') besides the interphone communication; a 1-byte region for informing the other Internet phone of a cause if there is an error or linking is not made; a 1-byte region for transferring a current status information of its own to all of the other Internet phones; a 8-byte region (3RD ID) for informing all the other Internet phones of the interphone number of a third Internet phone an additional function such as a multi-party conference-set up or a forward; a 2-byte region for informing the other Internet phone of an RTP (real-time transport protocol) port number of its own to open a voice channel after the call operation is finished.

The below Table 2 shows codes corresponding to each message type with respect to the MOCS call control message constructed by the above-described message frame.

TABLE 2

| Message type | Decimal | 87654321 |
|---|---|---|
| Setup-request | 6 | 00000110 |
| Setup-accept | 7 | 00000111 |
| Setup-reject | 8 | 00001000 |
| Connect | 9 | 00001001 |
| Disconnect | 10 | 00001010 |
| Digit number | 11 | 00001011 |
| Forward-on | 12 | 00001100 |
| Forward-off | 13 | 00001101 |
| Status | 14 | 00001110 |
| Conference-setup | 15 | 00001111 |
| VMS | 16 | 00010000 |
| ACK | X | 1XXXXXXX |

Each of the below Table 3 and Table 4 shows codes corresponding to the error cause and the status information when linking is not made. Use of each message type and signals will be described later.

TABLE 3

| Cause | Decimal | 87654321 |
|---|---|---|
| On Hook | 1 | 00000001 |
| Flash | 2 | 00000010 |
| Hold | 3 | 00000011 |
| Transfer | 4 | 00000100 |
| Busy | 5 | 00000101 |

TABLE 3-continued

| Cause | Decimal | 87654321 |
|---|---|---|
| Error | 6 | 00000110 |
| Unknown | 7 | 00000111 |

TABLE 4

| Status | Decimal | 87654321 |
|---|---|---|
| Idle | 1 | 00000001 |
| Busy | 2 | 00000010 |
| Hold | 3 | 00000011 |
| Access Denied | 4 | 00000100 |
| Invalid | 5 | 00000101 |
| Forward | 6 | 00000110 |

Figure 7:
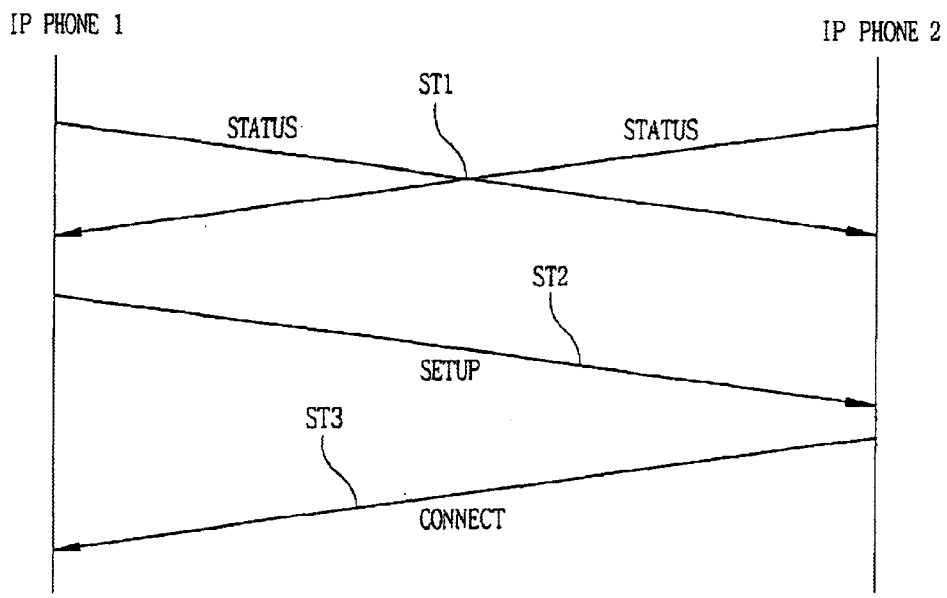
FIG. 7 is a state view of the linking process by adopting the Internet phone protocol in accordance with the present invention.

FIG. 7 is a side view of the linking process by adopting the Internet phone protocol in accordance with the present invention. As shown in this drawing, all of the Internet phones connected to the LAN transfer its status information to all of the other Internet phones whenever its own status is changed, and each Internet phone stores the status of the other Internet phone as received.

In this state, for example, if a first Internet phone (IP Phone 1) is desired to be connected to a second Internet phone (IP Phone 2), the first Internet phone judges whether or not the second Internet phone is in a feasible status for linking relying on the current status information that it has now and transfers a setup message to the second Internet phone. Then, upon receipt of the setup message from the first Internet phone, the second Internet phone transfers a connection message to the first Internet phone, by which the two Internet phones are linked.

Figure 8:
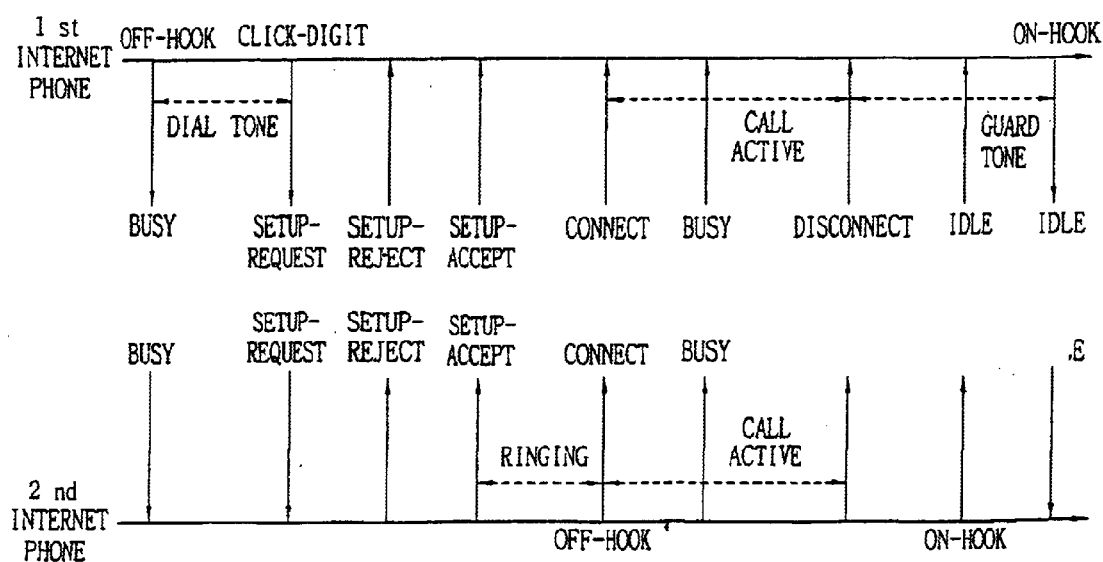
FIG. 8 is a state view showing linking and releasing between two Internet phones based on a protocol in accordance with the present invention.

FIG. 8 is a state view showing linking and releasing between two Internet phones based on a protocol in accordance with the present invention. As shown in this drawing, when a user lifts ('off-hook') a phone receiver of the first Internet phone (IP Phone 1) for linking to the second Internet phone, the status information ('busy') at the time is informed to all of the Internet phones connected to the LAN, and a dial tone is generated until buttons of an Interphone number of the phone are pressed down.

When the buttons of the interphone number are pressed down ('click digit'), a setup message ('setup-request') is transferred to the second Internet phone to request for linking. Upon receipt of it, the second Internet phone rings if it is in a feasible status for linking, and simultaneously, it transfers a response message ('setup-accept') to the first Internet phone. On the other hand, if it is not in the feasible statue for linking, it transfers a reject message ('setup reject') to the first Internet phone.

The first Internet phone received the response message would ring back tone, which will continue until the user of the second Internet phone lifts the phone receiver and receives a connection message.

At this time, the second Internet phone transfers the connection message to the first Internet phone, and simultaneously, informs all of the Internet phones of its status information ('busy'), so that it can not be linked to any other Internet phone.

When the user returns the phone receiver as the conversation on the Internet phone is finished, the second Internet phone transfers a disconnection message to the first Internet phone, while informing the other Internet phones of its status information ('idle') so that the other Internet phones can recognize that the second Internet phone is in a feasible status for linking.

Upon receipt of the disconnection message from the second Internet phone, the first Internet phone generates a guard tone to inform the user of the disconnection of linking, and when the user returns ('on-hook') the phone receiver, the first Internet phone informs all of the other Internet phones of its status information ('idle') that it is in a feasible status for linking.

As so far described, according to the Internet phone protocol of the present invention, since one Internet phone independently transfers its own status information to all of the other Internet phones connected to the LAN, it can be directly linked to a desired Internet phone without a call server. Therefore, connecting the Internet phone to the LAN itself makes a telephone network, which reduces time and expense incurred therefor. In addition, even though a specific position of the user is changed, the interphone number of the Internet phone itself is not changed, and also, since all of the Internet phones have the status information of the other Internet phones, even though there occurs a problem in a specific terminal, it won't affect the communication network. Furthermore, since the process for communication is very simple, a delay time taken for linking is much reduced, facilitating its use and management.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method of providing an Internet phone protocol, comprising:

providing a physical hierarchy for linking, maintaining and releasing between linking media;

providing a device driver hierarchy for defining driving characteristics of each electric and mechanic unit of the physical hierarchy;

providing a real time operating system programming hierarchy for controlling an overall system;

providing a user datagram protocol (UDP)/Internet protocol (IP) hierarchy for defining characteristics for processing a packet stream in packet change;

providing an interface hierarchy for receiving a user's intention to a system;

providing a voice/real-time transport protocol (VOICE/RTP) hierarchy for linking a voice channel between Internet phones; and providing an independent multimedia office communication system protocol hierarchy for rendering Internet phones to store in exchange status information to each other for independent and direct linking.

2. A method of providing an Internet phone protocol comprising:

providing a media access control header positioned at the uppermost place for setting a network address of a first Internet phone sending a message and a network address of a second Internet phone receiving the message;

providing an IP header (Internet protocol header) for setting an IP address and a UDP of the second Internet phone receiving the message;

providing a frame having a frame check sequence (FCS) for confirming whether a content of the first Internet phone is accurately transferred to the second Internet phone without an error; and providing a status message header having an interphone number, status information and error information for establishing a direct link between the first and second Internet phones.

3. The method of claim 2, wherein the status message header comprises:

a message type region positioned at the uppermost place for setting a message type required for a call control;

a region for setting a device type for discriminating a kind of each terminal connected to a LAN;

a group ID region for allocating a group for receiving a phone from an external source, like in a key phone;

a station ID region for setting a number on each terminal for intercommunication;

a status region for storing a current status information of each terminal; and an IP address region for storing an IP address of each terminal.

4. The method of claim 2, wherein the status message includes a 1-byte message type region for discriminating a message required for the call control and a 8-byte region for storing other terminal information.

5. The method of claim 2, wherein the status message header enables the direct link between the first and second Internet phones without using a call server.

6. The method of claim 2, wherein the network address is an Ethernet address.

7. An Internet phone comprising:

means for providing a media access control header positioned at the uppermost place for setting a network address of a first Internet phone sending a message over a network and a network address of a second Internet phone receiving the message;

means for providing an IP header (Internet protocol header) for setting an IP address and a UDP of the second Internet phone receiving the message;

means for providing a frame having a frame check sequence (FCS) for confirming whether a content of the first Internet phone is accurately transferred to the second Internet phone without an error; and means for providing an MOCS call control message having an interphone number, status information and error information for establishing an direct link between the first and second Internet phones.

8. The Internet phone of claim 5, wherein the MOCS call control message comprises:

a byte region positioned at an uppermost place for setting a message type required for a call control;

a byte region for setting an interphone number (Source ID) of an Internet phone for transferring a next message;

a byte region for setting an interphone number of an Internet phone for receiving the next message;

a byte region for setting a dialing number besides the interphone communication;

a byte region for informing the second Internet phone of a cause if there is an error or linking is not made;

a byte region for transferring a current status information of the first Internet phone to all other Internet phones on the network;

a byte region for informing all of the other Internet phones on the network of the interphone number of a third Internet phone as an additional function such as a multi-party conference-set up or a forward; and a byte region for informing the second Internet phone of an RTP (real-time transport protocol) port number of the first Internet phone to open a direct voice channel after the call operation is finished.

9. The Internet phone of claim 7, wherein the status message header enables the direct link between the first and second Internet phones without using a call server.

10. The Internet phone of claim 7, wherein the network address is an eithernet address.

11. An Internet phone transfer method for linking, comprising:

transmitting status information from one of a plurality of Internet phones on a network to all of the other Internet phones connected to the LAN whenever a status of the one Internet phone is changed;

storing status information of other Internet phones as received by each of the plurality of Internet phones and transmitting a setup message directly to a receiving Internet phone desired for connection, if the receiving Internet phone is in a feasible status for linking; and transmitting from the receiving the Internet phone a connection message directly to the Internet phone that transmitted the setup message.

12. The method of claim 11, wherein a communication link is established between the receiving Internet phone and the Internet phone that sent the setup message without using a call server on the LAN.

13. An Internet phone protocol transfer method comprising:

a step in which when a first Internet phone changes from an on hook state to an off hook state for linking to a second Internet phone, status information ('busy') of the first Internet phone at the time is provided to all other Internet phones connected to the LAN, and a dial tone is generated at the first Internet phone until buttons of an Interphone number of the first Internet phone are pressed down;

a step in which when the buttons of the Interphone number are pressed down, a setup message is transferred to a second Internet phone to request the establishment of a link between the first and second Internet phones, and then, the second Internet phone rings if the second Internet phone is in a feasible status for linking, and simultaneously, the second Internet phone transfers a response message to the first Internet phone, while if the second Internet phone is not in the feasible status for linking, the second Internet phone transfers a reject message to the first Internet phone;

a step in which the first Internet phone received the response message rings back tone, and the second Internet phone transfers a connection message to the first Internet phone, and simultaneously informs all other Internet phones connected to the LAN of its status information ('busy'), so that the second Internet phone cannot be linked to any other Internet other than the first Internet phone;

a step in which when the second Internet phone is returned to the on hook state from the off hook state, the second Internet phone transfers a disconnection message to the first Internet phone, while informing the other Internet phones connected to the LAN of its status information ('idle') so that the other Internet phones connected to the LAN can recognize that the second Internet phone is in a feasible status for linking; and a step in which, upon receipt of the disconnection message from the second Internet phone, the first Internet phone generates a guard tone to inform the user of the disconnection of the link, and when the first Internet phone is returned to the on hook state from the off hook state, the first Internet phone informs all of the other Internet phones connected to the LAN of its status information ('idle') to indicate that it is in a feasible status for linking, wherein the link between the first and second Internet phones is achieved without using a call server on the LAN.

14. The method of claim 13, wherein a communication link is established between the first and second Internet phone without using a call server.

15. A method of establishing a communication link between a plurality of Internet phones connected to a local area network (LAN), comprising:

transferring a status of a prescribed Internet phone from the prescribed Internet phone to the other ones of the plurality of Internet phones;

receiving and storing the status of the prescribed Internet phone at the age of the other ones of the plurality of Internet phones;

transmitting a setup message from an initiating one the plurality of Internet phones to at least one receiving Internet phone if the status of the at least one receiving Internet phone is in an available state; and transmitting a connection message from the at least one receiving Internet phone to the initiating Internet phone upon receiving the setup message from the initiating Internet phone, wherein the communication link between the initiating one of the plurality of Internet phones to the receiving one of the plurality of Internet phones is achieved without using a call server.

16. A method of establishing a communication link between first and second Internet phones connected to a local area network (LAN), comprising:

transferring a status of a first Internet phone from the first Internet phone to a second Internet phone over the LAN;

receiving and storing the status of the first Internet phone at the second Internet phone;

transmitting a setup message from the second Internet phone to the first Internet phone if the status of the first Internet phone is in an available state; and transmitting a connection message directly from the first Internet phone to the second Internet phone upon receiving the setup message from the second Internet phone, wherein the communication link between the first Internet phone to the second Internet phone is achieved without using a call server.

* * * * *